US012293658B2

(12) United States Patent
Nishino et al.

(10) Patent No.: US 12,293,658 B2
(45) Date of Patent: *May 6, 2025

(54) REPRODUCTION SYSTEM, REPRODUCTION METHOD, AND STORAGE MEDIUM

(71) Applicant: HONDA MOTOR CO., LTD., Tokyo (JP)

(72) Inventors: Tomoko Nishino, Wako (JP); Masahiro Daimon, Wako (JP); Masayuki Sato, Wako (JP); Yuya Kishimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/125,162

(22) Filed: Mar. 23, 2023

(65) Prior Publication Data
US 2023/0316900 A1    Oct. 5, 2023

(30) Foreign Application Priority Data

Mar. 30, 2022    (JP) .................................. 2022-054926
Mar. 30, 2022    (JP) .................................. 2022-056266

(51) Int. Cl.
*G08G 1/01*    (2006.01)
*G06T 7/246*    (2017.01)
(Continued)

(52) U.S. Cl.
CPC ........... *G08G 1/0129* (2013.01); *G06T 7/248* (2017.01); *G08G 1/0112* (2013.01);
(Continued)

(58) Field of Classification Search
CPC .......... G06T 7/70; G06V 20/58; G08G 1/012; G08G 1/0112; G08G 1/0141; B60R 1/22
See application file for complete search history.

(56) References Cited

U.S. PATENT DOCUMENTS

2019/0139449 A1*  5/2019  Zhang .................. G09B 19/167
2022/0398853 A1* 12/2022  Nishimura ........... G06V 20/584
(Continued)

FOREIGN PATENT DOCUMENTS

JP    2001-109986    4/2001

*Primary Examiner* — Mirza F Alam
(74) *Attorney, Agent, or Firm* — Amin, Turocy & Watson, LLP

(57) ABSTRACT

A reproduction system includes an external detection unit configured to acquire external information of an own vehicle, a vehicle sensor configured to acquire vehicle information of the own vehicle, a storage medium storing computer-readable instructions, and at least one processor connected to the storage medium, the at least one processor executing the computer-readable instructions to generate external time-series data indicating an external situation of the own vehicle in time series based on the external information, generate vehicle time series data indicating a driving situation of the own vehicle in time series based on the vehicle information, generate, based on the external time-series data and the vehicle time-series data, a moving image that reproduces a movement history of the own vehicle at a specific traffic location, and cause a display device to display the moving image.

23 Claims, 11 Drawing Sheets

(51) Int. Cl.
*G08G 1/052* (2006.01)
*B60R 1/22* (2022.01)

(52) U.S. Cl.
CPC ......... *G08G 1/0116* (2013.01); *G08G 1/0141* (2013.01); *G08G 1/052* (2013.01); *B60R 1/22* (2022.01); *G06T 2207/30256* (2013.01)

(56) References Cited

U.S. PATENT DOCUMENTS

| | | | | |
|---|---|---|---|---|
| 2023/0286548 | A1* | 9/2023 | Tanaka | G06T 7/70 |
| 2023/0322230 | A1* | 10/2023 | Kushibiki | B60W 30/18163 |
| | | | | 701/41 |
| 2024/0083429 | A1* | 3/2024 | Shimizu | G08G 1/09 |

* cited by examiner

REPRODUCTION SYSTEM, REPRODUCTION METHOD, AND STORAGE MEDIUM

CROSS-REFERENCE TO RELATED APPLICATION

Priority is claimed on Japanese Patent Application Nos. 2022-054926, filed Mar. 30, 2022, and 2022-056266, filed Mar. 30, 2022, the content of which is incorporated herein by reference.

BACKGROUND

Field of the Invention

The present invention relates to a reproduction system, a reproduction method, and a storage medium.

Description of Related Art

Efforts to provide sustainable traffic-related technologies that are considerate of vulnerable people among traffic participants have become active in recent years. To achieve this, a focus has been made on research and development to further improve the safety and convenience of traffic through research and development related to driving support technology.

Japanese Unexamined Patent Application, First Publication No. 2001-109986 discloses an image display system that displays images captured from various points along a travel route of a vehicle at a traffic accident site in association with a sketch to enable efficient site verification of a traffic accident. This system reproduces changes in a visual field image as seen from the driver as a moving image.

SUMMARY

In the related art, a situation at a specific traffic location where an own vehicle interferes with another traffic participant sometimes cannot be reproduced in an easy-to-understand manner.

In the related art, it is also difficult for the driver to objectively review the driving history of the own vehicle when the own vehicle has stopped due to an indicator indicating stop such as a traffic signal or a temporary stop sign.

The present invention has been made in view of the above circumstances and an object of the present invention is to provide a reproduction system, a reproduction method, and a storage medium capable of reproducing a situation at a specific traffic location in an easy-to-understand manner.

(1) A reproduction system according to an aspect of the present invention includes an external detection unit configured to acquire external information of an own vehicle, a vehicle sensor configured to acquire vehicle information of the own vehicle, a storage medium storing computer-readable instructions, and at least one processor connected to the storage medium, in which the at least one processor executes the computer-readable instructions to generate external time-series data indicating an external situation of the own vehicle in time series based on the external information, generate vehicle time series data indicating a driving situation of the own vehicle in time series based on the vehicle information, generate, based on the external time-series data and the vehicle time-series data, a moving image that reproduces a movement history of the own vehicle at a specific traffic location, and cause a display device to display the moving image.

(2) In the above-described aspect (1), the at least one processor executes the computer-readable instructions to generate, based on the external time-series data and the vehicle time-series data, a moving image that reproduces a movement history of another traffic participant whose course intersects that of the own vehicle at the specific traffic location together with the movement history of the own vehicle at the specific traffic location.

(3) In the above-described aspect (1), the at least one processor executes the computer-readable instructions to generate, based on the external time-series data and the vehicle time-series data, a moving image that reproduces the movement history of the own vehicle at the specific traffic location from a perspective of another traffic participant whose course intersects that of the own vehicle at the specific traffic location.

(4) In the above-described aspect (2) or (3), the external detection unit includes an image sensor configured to capture an image in front of the own vehicle, the external time-series data includes time-series positions of a stop line and a lane line on a road on which the own vehicle has traveled, and the at least one processor executes the computer-readable instructions to transmit the vehicle time-series data through an in-vehicle communication network of the own vehicle.

(5) In one of the above-described aspects (2) to (4), the specific traffic location is an intersection, and the at least one processor executes the computer-readable instructions to display the intersection in the moving image using information regarding a reference line marked on a road before the own vehicle changes course at the intersection and information regarding a second reference line marked on a road after the own vehicle changes course at the intersection.

(6) In one of the above-described aspects (2) to (5), the at least one processor executes the computer-readable instructions to generate abstracted image data corresponding to the other traffic participant using information regarding the other traffic participant included in the external time-series data and display the image data in the moving image as the other traffic participant.

(7) In the above-described aspect (1), the specific traffic location includes a stop indicator installed on a road on which the own vehicle travels, the stop indicator instructing the own vehicle to stop, and the at least one processor executes the computer-readable instructions to generate, based on the external time-series data and the vehicle time-series data, a moving image that reproduces the movement history of the own vehicle from a position before a target stop position of the own vehicle to the target stop position at the specific traffic location.

(8) In the above-described aspect (7), the target stop position is a position of a stop line on the road on which the own vehicle travels, the external detection unit includes an image sensor configured to capture an image in front of the own vehicle, the external time-series data includes a time-series position of the stop line and a time-series position of a lane line on the road on which the own vehicle travels, the at least one processor executes the computer-readable instructions to transmit the vehicle time-series data through an in-vehicle communication network of the own vehicle, and the at least one processor executes the computer-readable instructions to display the stop line and the lane line in the moving image using information regarding the stop line and the lane line included in the external time-series data.

(9) In the above-described aspect (7) or (8), the stop indicator includes a traffic signal, and the at least one processor executes the computer-readable instructions to generate a moving image that reproduces the movement history of the own vehicle when the traffic signal is red.

(10) In one of the above-described aspects (7) to (9), the at least one processor executes the computer-readable instructions to generate a graph image showing a change in vehicle speed of the own vehicle at the specific traffic location based on the vehicle time-series data, and cause the display device to display the graph image.

(11) In one of the above-described aspects (7) to (10), the moving image is a moving image of the own vehicle as seen from a direction intersecting a traveling direction of the own vehicle.

(12) In one of the above-described aspects (1) to (11), the reproduction system further includes an internal detection unit configured to acquire internal information of the own vehicle, the at least one processor executes the computer-readable instructions to generate a moving image that reproduces a movement of a driver of the own vehicle together with the movement history of the own vehicle at the specific traffic location based on driver time-series data generated based on the internal information, the driver time-series data indicating a situation of the driver of the own vehicle in time series.

(13) A reproduction method according to an aspect of the present invention includes, by a computer for a reproduction system including an external detection unit configured to acquire external information of an own vehicle and a vehicle sensor configured to acquire vehicle information of the own vehicle, generating a moving image that reproduces a movement history of the own vehicle at a specific traffic location based on external time-series data generated based on the external information, the external time-series data indicating an external situation of the own vehicle in time series, and vehicle time-series data generated based on the vehicle information, the vehicle time-series data indicating a driving situation of the own vehicle in time series; and causing a display device to display the moving image.

(14) In the above-described aspect (13), a moving image that reproduces a movement history of another traffic participant whose course intersects that of the own vehicle at the specific traffic location together with the movement history of the own vehicle at the specific traffic location is generated based on the external time-series data and the vehicle time-series data.

(15) In the above-described aspect (13), a moving image that reproduces the movement history of the own vehicle at the specific traffic location from a perspective of another traffic participant whose course intersects that of the own vehicle at the specific traffic location is generated based on the external time-series data and the vehicle time-series data.

(16) In the above-described aspect (13), the specific traffic location includes a stop indicator installed on a road on which the own vehicle travels, the stop indicator instructing the own vehicle to stop, and a moving image that reproduces the movement history of the own vehicle from a position before a target stop position of the own vehicle to the target stop position at the specific traffic location is generated based on the external time-series data and the vehicle time-series data.

(17) A storage medium according to an aspect of the present invention is a non-transitory computer storage medium storing a reproduction program causing a computer for a reproduction system including an external detection unit configured to acquire external information of an own vehicle and a vehicle sensor configured to acquire vehicle information of the own vehicle to generate a moving image that reproduces a movement history of the own vehicle at a specific traffic location based on external time-series data generated based on the external information, the external time-series data indicating an external situation of the own vehicle in time series, and vehicle time-series data generated based on the vehicle information, the vehicle time-series data indicating a driving situation of the own vehicle in time series, and cause a display device to display the moving image.

(18) In the above-described aspect (17), the reproduction program causes the computer for the reproduction system to generate, based on the external time-series data and the vehicle time-series data, a moving image that reproduces a movement history of another traffic participant whose course intersects that of the own vehicle at the specific traffic location together with the movement history of the own vehicle at the specific traffic location.

(19) In the above-described aspect (17), the reproduction program causes the computer for the reproduction system to generate, based on the external time-series data and the vehicle time-series data, a moving image that reproduces the movement history of the own vehicle at the specific traffic location from a perspective of another traffic participant whose course intersects that of the own vehicle at the specific traffic location.

(20) In the above-described aspect (17), the specific traffic location includes a stop indicator installed on a road on which the own vehicle travels, the stop indicator instructing the own vehicle to stop, and the reproduction program causes the computer for the reproduction system to generate, based on the external time-series data and the vehicle time-series data, a moving image that reproduces the movement history of the own vehicle from a position before a target stop position of the own vehicle to the target stop position at the specific traffic location.

According to the above aspects of the present invention, it is possible to provide a reproduction system, a reproduction method, and a storage medium capable of reproducing a situation at a specific traffic location in an easy-to-understand manner.

DESCRIPTION OF EMBODIMENTS

First Embodiment

Figure 1:
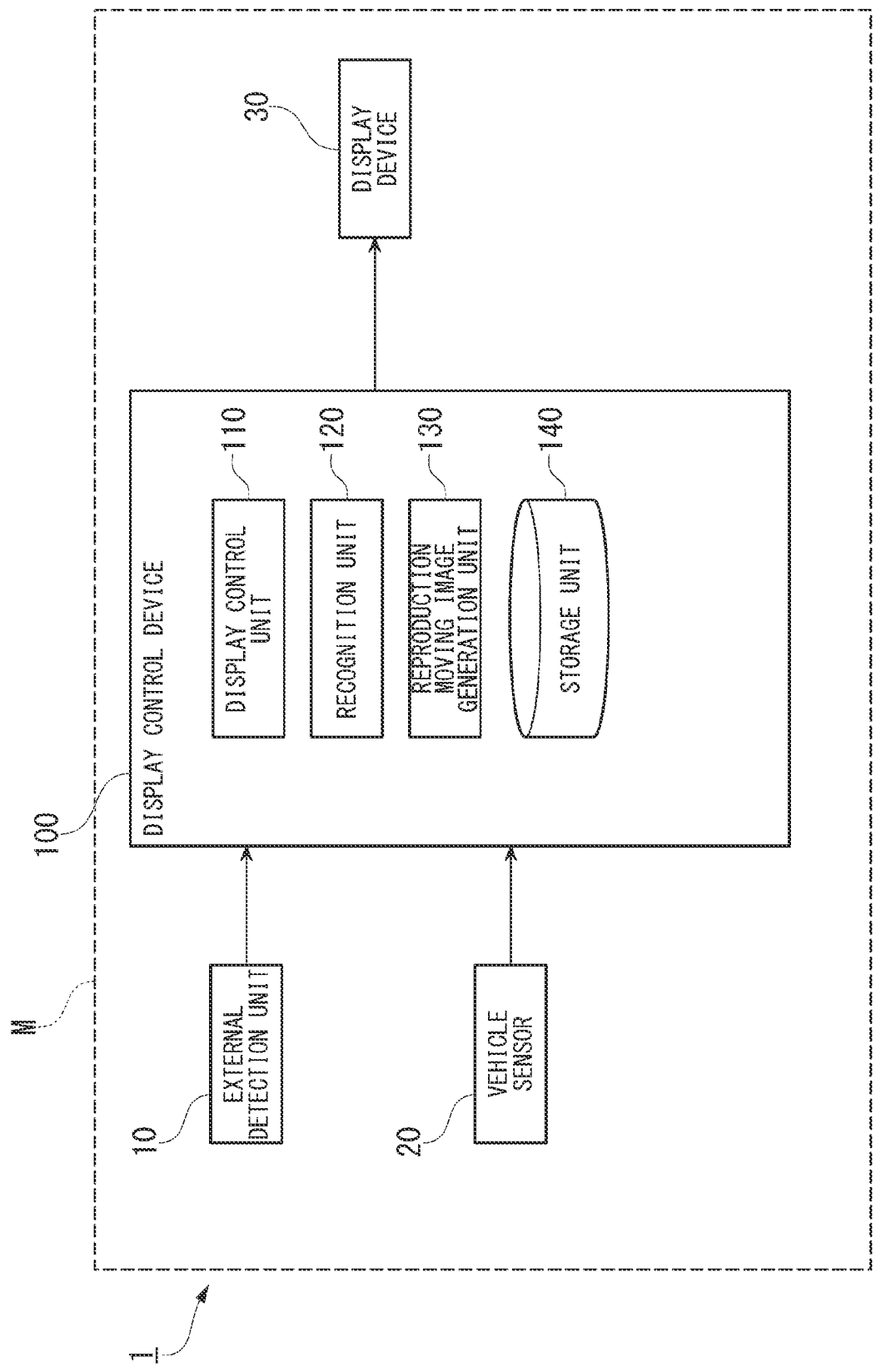
FIG. 1 is a block diagram showing an exemplary configuration of a reproduction system according to a first embodiment.

A reproduction system, a reproduction method, and a storage medium storing a reproduction program according to a first embodiment will be described below with reference to the drawings. FIG. 1 is a block diagram showing an exemplary configuration of a reproduction system 1 according to the present embodiment. The reproduction system 1 is configured to generate, by computer graphics, a moving image (hereinafter also referred to as a reproduction moving image) that reproduces the driving history of a vehicle at a location where a plurality of traffic participants are involved (hereinafter referred to as a specific traffic location). The reproduction system 1 is also configured to display the generated reproduction moving image.

The reproduction system 1 includes, for example, an external detection unit 10, vehicle sensors 20, a display device 30, and a display control device 100. The external detection unit 10, the vehicle sensors 20, the display device 30, and the display control device 100 may be mounted to the own vehicle M. These devices or apparatuses may be connected to each other by a multiplex communication line or a serial communication line such as a controller area network (CAN) communication line, a wireless communication network, or the like. The components shown in FIG. 1 are merely an example and some of the components may be omitted or other components may be added.

The own vehicle M is, for example, two-wheeled, three-wheeled, or four-wheeled and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The external detection unit 10 includes various devices for acquiring external information of the own vehicle M. The "external information" includes information regarding, for example, the shapes and positions (relative positions with respect to the own vehicle M) of other traffic participants, lane lines or pedestrian crossings drawn on or attached to the road surface, bicycle crossings, road surface markings such as temporary stop lines, road signs, traffic signals, railroad crossings, curbs, median strips, guardrails, or fences. The "other traffic participants" include, for example, vehicles (such as two-wheeled vehicles or four-wheeled vehicles) or pedestrians. In examples of moving images shown in FIG. 2 and the like, an oncoming vehicle X is displayed as an example of "another traffic participant." That is, the "external information" includes information regarding the oncoming vehicle X. Also, in the examples of the moving images shown in FIG. 2 and the like, the own vehicle M is turning right and the oncoming vehicle X is going straight at an intersection. Thus, the courses of the own vehicle M and the oncoming vehicle X intersect at the intersection.

The external detection unit 10 includes, for example, a camera, a light detection and ranging (LIDAR) device, a radar device, or a sensor fusion device. The camera can be, for example, a digital camera or a stereo camera using a solid-state imaging device such as charge coupled device (CCD) or complementary metal oxide semiconductor (CMOS). The camera serving as the external detection unit 10 captures an image in front of the own vehicle M and outputs the captured image as image data.

The vehicle sensors 20 include a vehicle speed sensor that detects the speed of the own vehicle M, a gyro sensor that detects an angular velocity, a steering sensor that detects the amount of steering of the own vehicle M by a steering wheel (for example, a steering angle), an accelerator pedal sensor that detects the amount of operation of an accelerator pedal or the presence or absence of operation thereof, a brake pedal sensor that detects the amount of operation of a brake pedal or the presence or absence of operation thereof, an acceleration sensor that detects acceleration, an orientation sensor that detects the orientation of the own vehicle M, and the like. The gyro sensor includes, for example, a yaw rate sensor that detects an angular velocity about a vertical axis.

The display control device 100 includes, for example, a display control unit 110, a recognition unit 120, a reproduction moving image generation unit 130, and a storage unit 140. The functions of the display control unit 110, the recognition unit 120, and the reproduction moving image generation unit 130 are implemented, for example, by a hardware processor such as a central processing unit (CPU) executing a program (software). Some or all of these components may be implemented by hardware (including circuitry) such as a large-scale integration (LSI), an application specific integrated circuit (ASIC), a field-programmable gate array (FPGA), or a graphics processing unit (GPU) or may be implemented by software and hardware in cooperation. The program may be stored in a storage device (not shown) in advance or may be stored in a detachable storage medium (a non-transitory storage medium) such as a DVD or a CD-ROM and then installed by mounting the storage medium in a drive device. Some or all of the functions of the display control unit 110, the recognition unit 120, and the reproduction moving image generation unit 130 may be implemented by the same hardware.

The recognition unit 120 recognizes situations such as the types and positions of objects present near the own vehicle M based on the external information output by the external detection unit 10. The "objects" include, for example, some or all of moving objects such as vehicles, bicycles, and pedestrians, lane boundaries such as lane lines, steps, guardrails, road shoulders, and median strips, structures installed on roads such as road signs and billboards, and debris present (fallen) on lanes.

For example, when image data captured by the camera of the external detection unit 10 has been input to the recognition unit 120, the recognition unit 120 may input the image data to a trained model, which has been trained to output an image recognition result, to acquire an external situation. The type of an object can also be estimated based on the size of the object in the image data, the intensity of a reflected wave received by the radar device of the external detection unit 10, or the like. The recognition unit 120 may also acquire, for example, the moving speed of another traffic participant that the radar device has detected using Doppler shift or the like.

The positions of objects are recognized, for example, as positions in relative coordinates (that is, positions relative to the own vehicle M) with a representative point (such as the center of gravity or the center of a drive shaft of the own vehicle M) as the origin. The positions of objects include, for example, relative positions of other traffic participants, left lane lines, right lane lines, left curbs, right curbs, stop lines, or traffic signals with respect to the own vehicle M.

The display control unit 110 generates external time-series data indicating an external situation of the own vehicle M in time series based on the recognition result output by the recognition unit 120. The display control unit 110 also generates vehicle time-series data indicating a driving situation of the own vehicle M in time series based on the vehicle information output by the vehicle sensors 20.

The external time-series data includes, for example, a distance from the own vehicle M to a left lane line, a distance from the own vehicle M to a right lane line, a distance from the own vehicle M to a left curb, a distance from the own vehicle M to a right curb, a distance from the own vehicle M to a stop line, a distance from the own vehicle M to a traffic signal, and the types and positions with respect to the own vehicle M of other traffic participants in time series.

The vehicle time-series data includes, for example, a yaw rate, a vehicle speed, steering wheel operation information, accelerator operation information, brake operation information, light operation information, turn signal operation information, wiper operation information, and hazard light operation information in time series.

The display control unit 110 inputs the external time-series data and the vehicle time-series data to the reproduction moving image generation unit 130. The display control unit 110 determines whether to cause the reproduction moving image generation unit 130 to generate a reproduction moving image, whether to cause the display device to display the reproduction moving image, and the like. The display control unit 110 performs control based on the determination result. For example, upon determining to cause the display device 30 to display a reproduction moving image, the display control unit 110 performs processing for causing the display device 30 to display the reproduction moving image.

The display device 30 displays the reproduction moving image generated by the reproduction moving image generation unit 130. When the display device 30 is mounted to the own vehicle M, the display device 30 may display an information image representing various information to be presented to the driver of the own vehicle M in addition to the reproduction moving image. The display device 30 is, for example, a liquid crystal display (LCD) incorporated in a dashboard or instrument panel of the own vehicle M. The display device 30 may not be mounted to the own vehicle M.

The storage unit 140 stores abstracted image data corresponding to the types of objects (hereinafter referred to as abstract data). For example, when the types of objects are vehicles, abstract data may be prepared for each of the types of vehicles (such as a two-wheeled vehicle, a four-wheeled vehicle, and a large vehicle). The storage unit 140 may also store abstract data corresponding to objects (such as, for example, traffic signals, signs, and buildings) other than traffic participants.

The reproduction moving image generation unit 130 may use the sizes of objects recognized by the recognition unit 120 as parameters to adjust the shapes of corresponding abstract data and then use the abstract data with the adjusted shapes to generate a reproduction moving image. The reproduction moving image generation unit 130 may correct the shapes of objects displayed in the reproduction moving image based on the shape of a straight reference line (such as, for example, a stop line) on the road. Because the reference line is a straight line, a more realistic reproduction moving image can be generated, for example, by correcting the shape of each object such that the reference line becomes a straight line in a reproduction moving image from a bird's eye perspective.

The reproduction moving image generation unit 130 generates a reproduction moving image at a specific traffic location based on the external time-series data and the vehicle time-series data. The reproduction moving image generated by the reproduction moving image generation unit 130 will be described below.

The reproduction moving image generation unit 130 generates a background image at a specific traffic location where the own vehicle M has traveled based on the external time-series data. The background image may include, for example, roads and nearby structures (such as buildings, guardrails, and three-dimensional signs). Lines marked on roads such as lane lines may be rendered (drawn) in the moving image based on geometric data recognized by the recognition unit 120, rather than based on the abstract data stored in the storage unit 140. When the specific traffic location is an intersection, the reproduction moving image generation unit 130 may calculate an intersection angle thereof at which a plurality of roads intersect and draw the roads included in the background image based on the calculation result.

The intersection angle can be calculated, for example, as follows. First, a trajectory of the own vehicle M which starts at a specific first time and ends at a second time after the first time is calculated based on the yaw rate and vehicle speed of the own vehicle M included in the vehicle time-series data. Based on information such as a reference line (for example, a stop line on a road before changing the traveling direction) included in the external time-series data, a relative position of the own vehicle M with respect to the reference line at the first time is calculated. Based on information such as a second reference line (for example, a stop line on a road after changing the traveling direction) included in the external time-series data, a relative position of the own vehicle M relative to the second reference line at the second time is calculated. Then, an angle between the reference line and the second reference line is calculated using the angle of change in the traveling direction of the own vehicle M from the first time to the second time, the angle of the reference line with respect to the own vehicle M at the first time, and the angle of the second reference line with respect to the own vehicle M at the second time. In this way, the intersection angle can be calculated.

The intersection angle may be acquired by referring to map information stored in advance rather than calculating the intersection angle. In this case, position information acquired by a global positioning system (GPS) device mounted to the own vehicle M is used to identify the position of the intersection in the map information and an intersection angle at the identified intersection is extracted from the map information. However, calculating the intersection angle can sometimes reduce the amount of processing and the processing time involved in generating a moving image, compared to the case of using position information acquired by the GPS device.

The reproduction moving image generation unit 130 reads abstract data corresponding to the type of an object recognized by recognition unit 120 from the storage unit 140. For example, when the recognition unit 120 has recognized the presence of an oncoming vehicle ahead of the own vehicle M, the reproduction moving image generation unit 130 reads abstract data corresponding to the type of the oncoming vehicle (such as a two-wheeled vehicle or a four-wheeled vehicle).

The reproduction moving image generation unit 130 adjusts the shape of the abstract data displayed in the reproduction moving image based on the size of the object recognized by the recognition unit 120. For example, when the recognition unit 120 has recognized a lateral width dimension of the oncoming vehicle, the reproduction moving image generation unit 130 adjusts the lateral width of abstract data indicating the oncoming vehicle using the recognized lateral width dimension. In scenes of the reproduction moving images shown in FIGS. 2, 3, and 5, the oncoming vehicle X is displayed using abstract data whose shape has been adjusted.

The reproduction moving image generation unit 130 dynamically displays a movement history of the own vehicle M at the specific traffic location in the reproduction moving image based on information such as the yaw rate and the vehicle speed included in the vehicle time-series data.

Further, the reproduction moving image generation unit 130 dynamically displays a movement history of another traffic participant at the specific traffic location in the reproduction moving image based on the external time-series data. The position of the other traffic participant may be statically displayed in the reproduction moving image if the other traffic participant is stationary when the own vehicle M passes through the specific traffic location. When the reproduction moving image is a perspective from the other traffic participant, the appearance of the own vehicle M in the reproduction moving image changes depending on the position of the other traffic participant. Thus, in this case, position information of the other traffic participant in the external time-series data is also used in displaying the movement history of the own vehicle M. The reproduction moving image generation unit 130 may also display a trajectory L of the own vehicle M (see FIG. 2 and the like) in the reproduction moving image.

Figure 2:
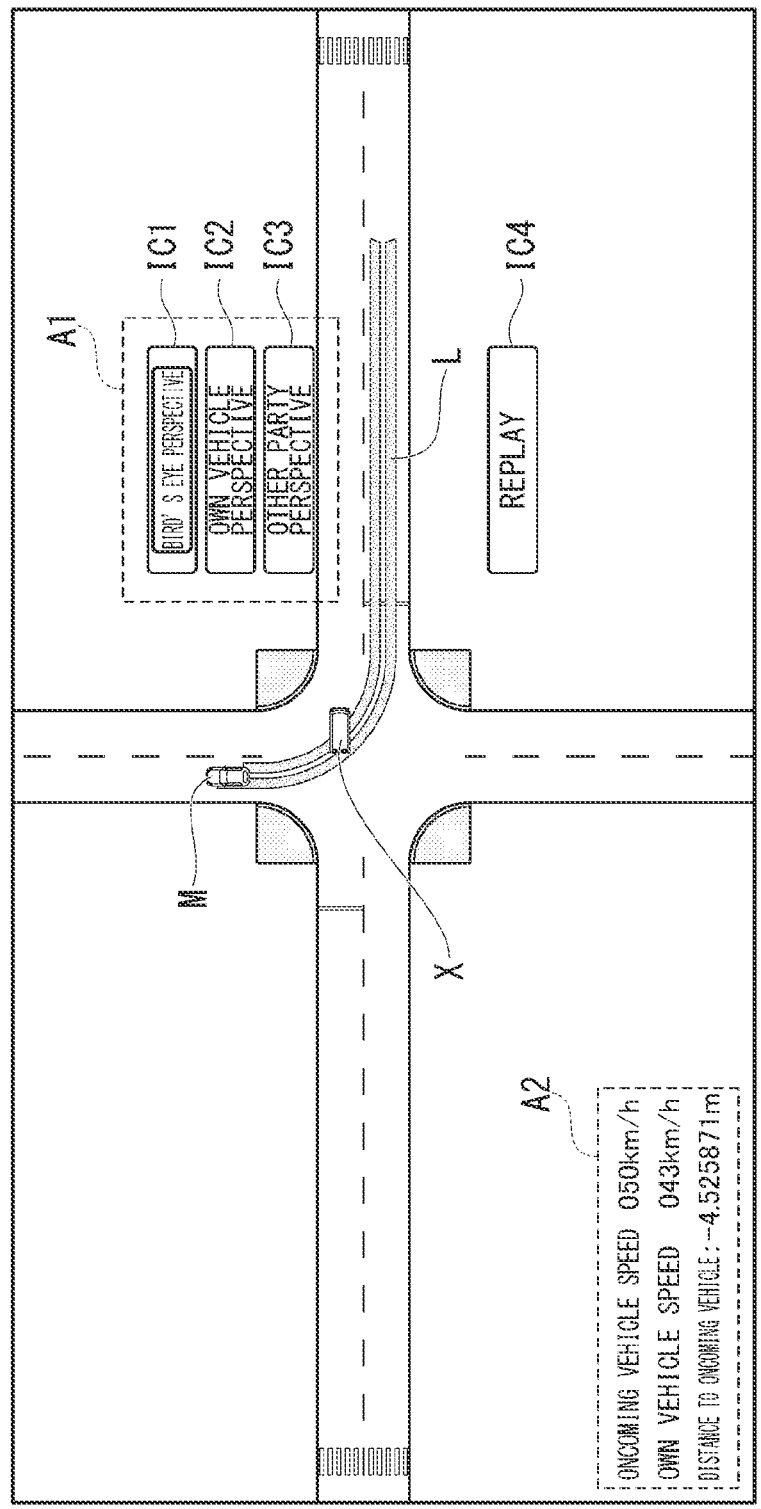
FIG. 2 is a diagram illustrating a scene of a reproduction moving image from a bird's eye perspective generated by the reproduction system of the first embodiment.
Figure 3:
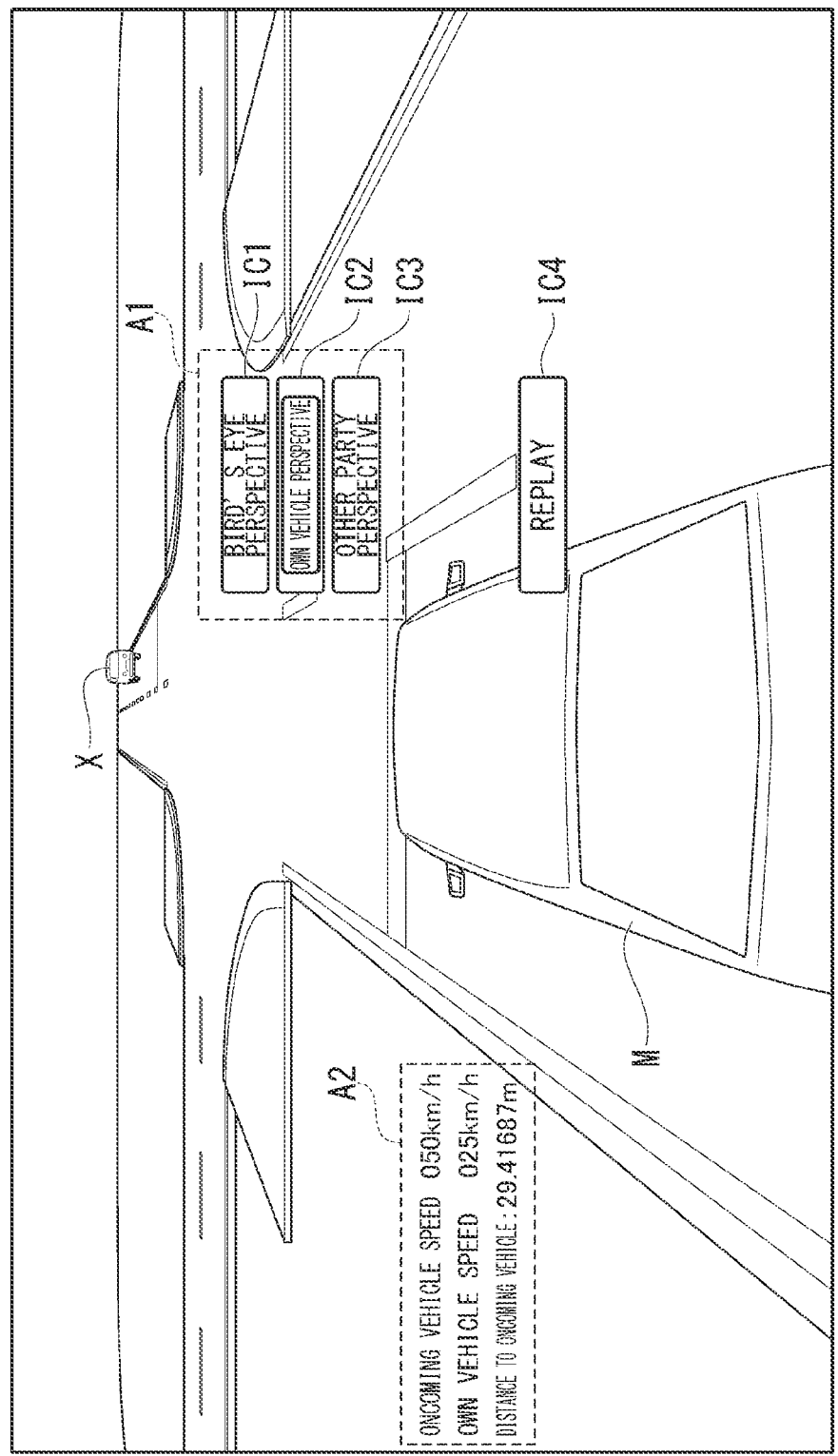
FIG. 3 is a diagram illustrating a scene of a reproduction moving image from an own vehicle perspective generated by the reproduction system of the first embodiment.
Figure 4:
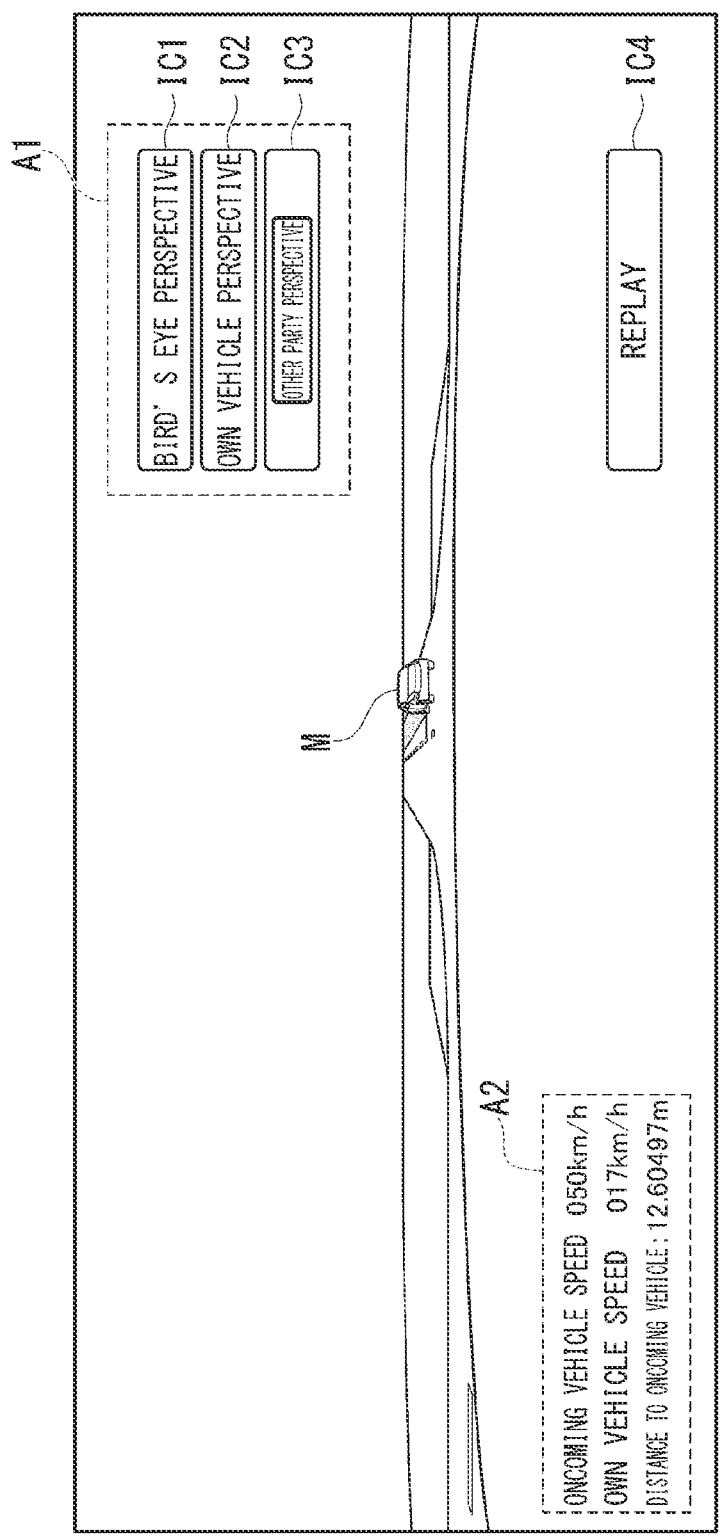
FIG. 4 is a diagram illustrating a scene of a reproduction moving image from another party perspective generated by the reproduction system of the first embodiment.
Figure 5:
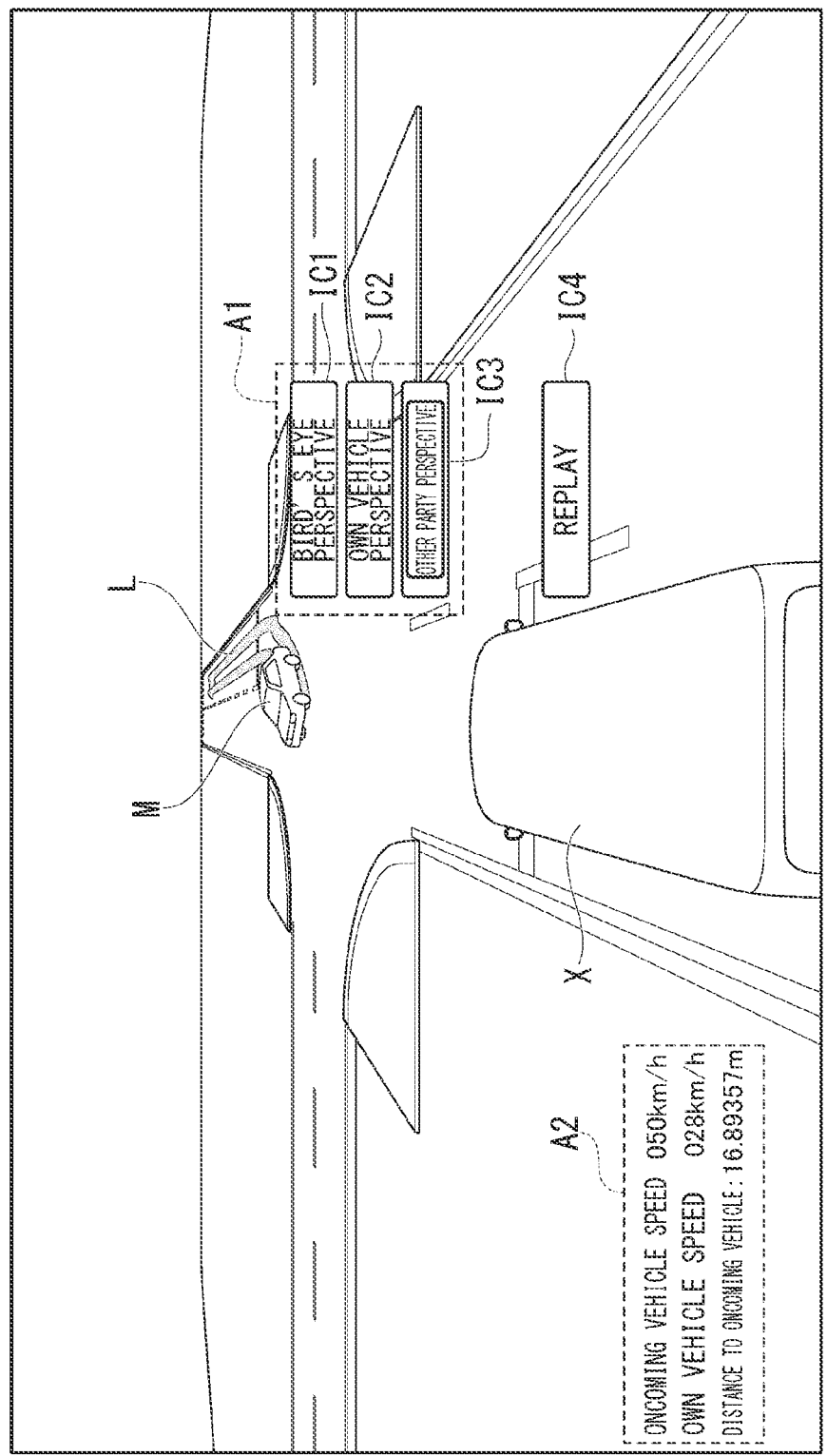
FIG. 5 is a diagram illustrating a scene of a reproduction moving image from another party perspective generated by the reproduction system of the first embodiment.

FIGS. 2 to 5 show examples of reproduction moving images generated by the reproduction moving image generation unit 130 and displayed on the display device 30. FIG. 2 shows a moving image from a bird's eye perspective, FIG. 3 shows a moving image from an own vehicle perspective, and FIGS. 4 and 5 show moving images from another party perspective. The bird's eye perspective is a perspective looking down on a specific traffic location from above. The other party perspective is a perspective of the own vehicle M as seen from another traffic participant. In the present specification, the bird's eye perspective and the other party perspective are collectively referred to as a "perspective outside the own vehicle M." The "other party perspective" may be a perspective from another traffic participant (for example, a perspective from the driver's seat of an oncoming vehicle X as shown in FIG. 4) or may be a perspective from above another traffic participant (for example, a perspective from above an oncoming vehicle X as shown in FIG. 5).

As shown in FIGS. 2 to 5, the reproduction moving image includes a background image showing a specific traffic location (an intersection in the example shown), a movement history of the own vehicle M, and a movement history of another traffic participant. The background image may be displayed statically or dynamically. For example, in the moving image from the bird's eye perspective shown in FIG. 2, the background image is statically displayed. In the moving images from the own vehicle perspective or the other party perspective shown in FIGS. 3 to 5, the background image is dynamically displayed according to the movement of the perspective (that is, the movement of the own vehicle M or the oncoming vehicle X).

As shown in FIGS. 2 to 5, the image displayed on the display device 30 may include a switch display area A1 and a traffic information display area A2. The switch display area A1 includes icons IC1 to IC3 for changing the perspective of the moving image. The icon IC1 is a graphical user interface (GUI) switch for selecting a moving image from the bird's eye perspective. The icon IC2 is a GUI switch for selecting a moving image from the own vehicle perspective. The icon IC3 is a GUI switch for selecting a moving image from the other party perspective. The image displayed on the display device 30 may also include an icon IC4 which is a GUI switch for replaying the moving image. The icon IC4 may be included in the switch display area A1.

When the user operates the icons IC1 to IC4, the display control unit 110 performs control corresponding to each of the icons IC1 to IC4. For example, when the icon IC2 (corresponding to the own vehicle perspective) is selected while the moving image from the bird's eye perspective is being displayed as shown in FIG. 2, the display control unit 110 transmits a moving image output command, which cause the reproduction moving image generation unit 130 to output a moving image from the own vehicle perspective, to the reproduction moving image generation unit 130. Upon receiving this moving image output command, the reproduction moving image generation unit 130 causes the display device 30 to display the moving image from the own vehicle perspective.

The reproduction moving image generation unit 130 may generate a moving image and cause the display device 30 to display the generated moving image each time a moving image output command is received. Alternatively, the reproduction moving image generation unit 130 may have a storage area for storing generated moving images, and upon receiving a moving image output command, retrieve a moving image stored in the storage area and output it to the display device 30.

The display control unit 110 may determine whether to cause the display device to display a reproduction moving image each time the own vehicle M stops. In this case, the display control unit 110 may cause the display device 30 to display a reproduction moving image only when a predetermined condition is satisfied. The "predetermined condition" may be a specifically defined condition which is considered to have room for improvement in terms of safety based on a driving situation of the own vehicle M. Specific examples of the "predetermined condition" are as follows. A first specific example is when the vehicle speed of the own vehicle M exceeds a threshold when the own vehicle M changes its traveling direction at an intersection. A second specific example is when the closest distance between the own vehicle M and another traffic participant falls below a threshold. A third specific example is when the distance between the own vehicle M and the other traffic participant is below a threshold and the relative speed of the own vehicle M with respect to the other traffic participant is above a threshold.

The traffic information display area A2 displays information regarding the traffic of the own vehicle M and another traffic participant (for example, an oncoming vehicle X) at a specific traffic location (for example, an intersection). In the examples of FIGS. 2 to 5, the traffic information display area A2 displays the vehicle speed of an oncoming vehicle (the vehicle speed of the oncoming vehicle X), the vehicle speed of the own vehicle, and the distance between the oncoming vehicle and the own vehicle M corresponding to the time series of the reproduction moving image. The traffic information display area A2 may not be displayed in the moving image. It may be possible to perform switching whether to display the traffic information display area A2.

Figure 6:
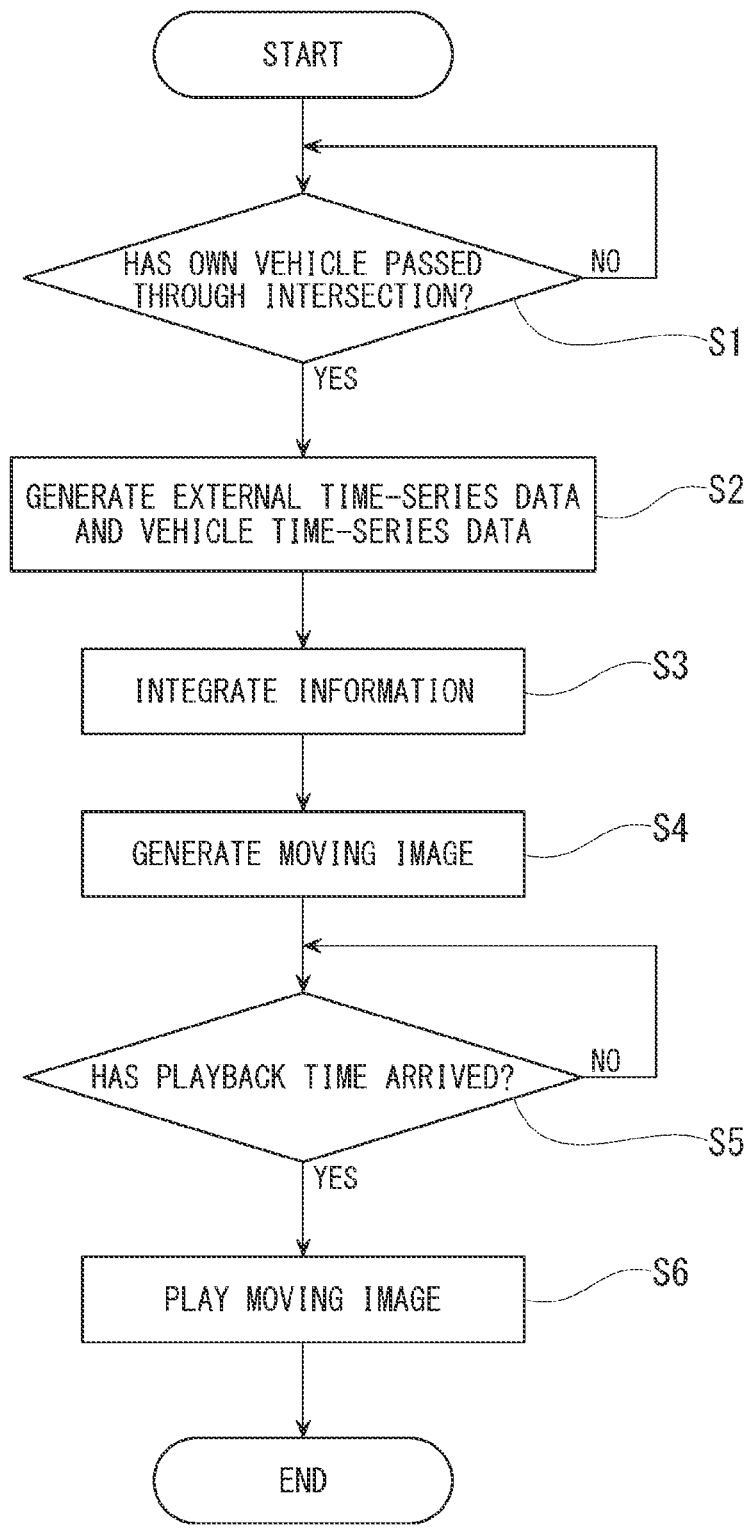
FIG. 6 is a flowchart showing an example of a process performed by the reproduction system of the first embodiment.

FIG. 6 is a flowchart showing an example of a process performed by the reproduction system 1. This flowchart is an example and a process may also be performed according to another flowchart.

In the example of FIG. 6, first, the display control unit 110 determines whether the own vehicle M has passed through an intersection (a specific traffic location). Upon determining that the own vehicle M has passed through an intersection (YES in step S1), the process proceeds to step S2. In step S2, the display control unit 110 generates external time-series data and vehicle time-series data around the time when the own vehicle passes through the intersection. The vehicle time-series data and the external time-series data may be constantly generated while the own vehicle M is traveling.

In step S3, the display control device 100 (for example, the display control unit 110 or the reproduction moving image generation unit 130) integrates information necessary to generate a moving image. In step S4, the reproduction moving image generation unit 130 generates a reproduction moving image. In step S5, the display control unit 110 determines whether a playback time has arrived. Upon determining that the playback time has arrived, the process proceeds to step S6 and the display control unit 110 causes the display device 30 to display the reproduction moving image.

As described above, the reproduction system 1 of the present embodiment includes the external detection unit 10 that acquires external information, the vehicle sensor 20 that acquires vehicle information of the own vehicle M, the reproduction moving image generation unit 130 that generates a moving image that reproduces a movement history of the own vehicle M at a specific traffic location, and the display control unit 110 that causes the display device 30 to display the moving image. The reproduction moving image generation unit 130 generates a moving image based on external time-series data generated based on the external information, the external time-series data indicating an external situation of the own vehicle M in time series, and vehicle time-series data generated based on the vehicle information, the vehicle time-series data indicating a driving situation of the own vehicle M in time series.

According to the reproduction system 1, the movement history of the own vehicle M at a specific traffic location can be reproduced through a moving image generated by computer graphics. Thus, the situation at the specific traffic location can be reproduced in an easy-to-understand manner. In addition, the flexibility of displaying the movement history of the own vehicle M can be improved compared to, for example, a moving image obtained by video capturing, and for example, a moving image from an objective perspective can be shown to the driver. This makes it possible to effectively promote safe driving.

The reproduction moving image generation unit 130 generates, based on the external time-series data and the vehicle time-series data, a moving image that reproduces the movement history of the own vehicle M at the specific traffic location and the movement history of another traffic participant (for example, an oncoming vehicle X) whose course intersects that of the own vehicle M at the specific traffic location together.

The reproduction moving image generation unit 130 generates, based on the external time-series data and the vehicle time-series data, a moving image that reproduces the movement history of the own vehicle M at the specific traffic location from a perspective outside the own vehicle M (for example, from a bird's eye perspective or from a perspective of another traffic participant).

According to this reproduction system 1, the situation at the specific traffic location where the own vehicle M interferes with another traffic participant can be reproduced in an easy-to-understand manner.

The external detection unit 10 may include an image sensor that captures an image in front of the own vehicle M, the external time-series data may include time-series positions of a stop line and a lane line on a road on which the own vehicle M has traveled, and the vehicle time-series data may be input to the reproduction moving image generation unit 130 through an in-vehicle communication network (a CAN) of the own vehicle M. According to this configuration, a reproduction moving image can be generated using existing hardware resources installed in the vehicle.

The specific traffic location may be an intersection. Then, the reproduction moving image generation unit 130 may cause the intersection to be displayed in the reproduction moving image using information regarding a reference line marked on a road before the own vehicle M changes course at the intersection and information regarding a second reference line marked on a road after the own vehicle M changes course at the intersection. In this case, the intersection can be displayed in the reproduction moving image without using GPS, map information, or the like and the processing load when generating the reproduction moving image can be reduced. By reducing the processing load, a reproduction moving image can be generated in a short time, and a reproduction moving image can be displayed on the display device 30 in a timely manner, for example, when the own vehicle M stops.

The reproduction moving image generation unit 130 may generate abstracted image data corresponding to the other traffic participant using information regarding the other traffic participant included in the external time-series data and display the image data in the reproduction moving image as the other traffic participant. By using abstracted image data in this way, the processing load can be reduced compared to, for example, the case of displaying photographed data of the other traffic participant in the reproduction moving image.

The reproduction moving image may be a bird's eye perspective, a perspective from another traffic participant, or a perspective from the own vehicle. The perspective of the reproduction moving image may be made selectable. This can further improve the flexibility of the moving image display.

Figure 7:
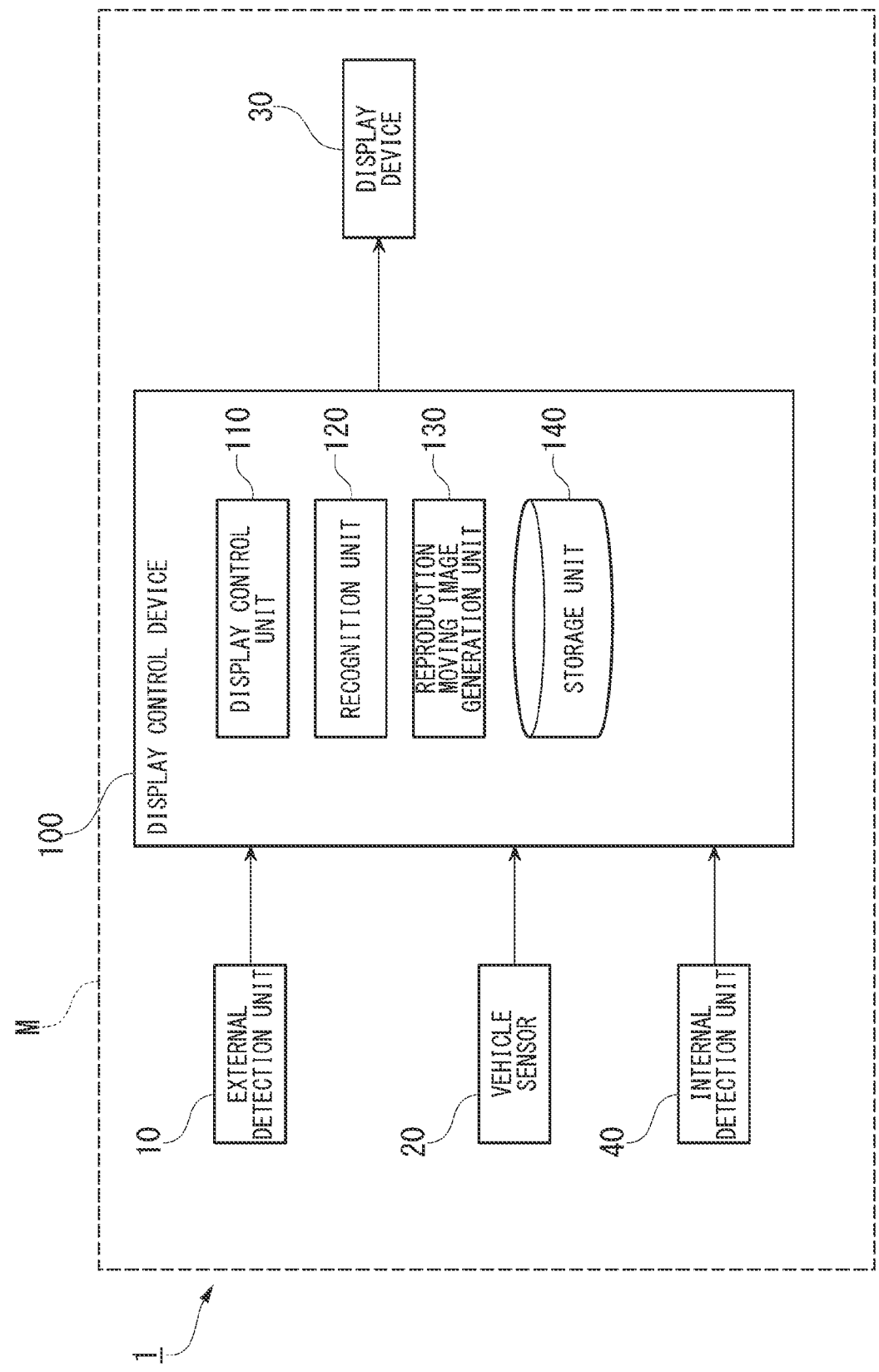
FIG. 7 is a block diagram showing an exemplary configuration of a reproduction system according to a modification of the first embodiment.

FIG. 7 is a block diagram showing an exemplary configuration of a reproduction system 1 according to a modification of the first embodiment. As shown in FIG. 7, in this modification, the reproduction system 1 further includes an internal detection unit 40 that acquires internal information of the own vehicle M. The "internal information" includes, for example, information on the driver of the own vehicle M. The internal detection unit 40 includes, for example, a vehicle interior camera. The vehicle interior camera is, for example, a digital camera using a solid-state imaging device such as CCD or CMOS. The vehicle interior camera is attached to, for example, a position where it can image the driver of the own vehicle M. The vehicle interior camera serving as the internal detection unit 40 captures an image of, for example, the driver of the own vehicle M and outputs the captured image as image data.

The recognition unit 120 recognizes the situation of the driver of the own vehicle M based on the internal information output by the internal detection unit 40. For example, the recognition unit 120 analyzes an image captured by the vehicle interior camera of the internal detection unit 40 and recognizes the orientation of the face of the driver and the direction of the line of sight of the driver based on the analysis result.

The display control unit 110 generates driver time-series data indicating the situation of the driver of the own vehicle M in time series based on the recognition result output by the recognition unit 120. The display control unit 110 inputs the driver time-series data to the reproduction moving image generation unit 130.

The reproduction moving image generation unit 130 generates a reproduction moving image at the specific traffic location based on the external time-series data, the vehicle time-series data, and the driver time-series data. Specifically, in addition to a background image at the specific traffic location, a moving image showing the movement history of the own vehicle M, and a moving image showing the movement history of the other traffic participant, the reproduction moving image generation unit 130 generates a moving image showing the motion of the driver of the own vehicle M based on the driver time-series data. That is, the reproduction moving image generation unit 130 dynamically displays the motion of the driver of the own vehicle M in the reproduction moving image. For example, the reproduction moving image generation unit 130 generates a moving image showing the orientation of the head of the driver of the own vehicle M based on the orientation of the face of the driver of the own vehicle M recognized by the recognition unit 120. In this case, the driver can easily review his or her driving operation. The reproduction moving image generation unit 130 may dynamically display the range of the driver's visual field in the reproduction moving image based on the direction of the line of sight of the driver recognized by the recognition unit 120. The range of the driver's visual field may be displayed as a translucent cone or the like. In this case, it is possible to easily review the line of sight of the driver during driving.

In another modification of the first embodiment, the reproduction moving image generation unit 130 may generate a moving image showing the motion of the driver of the own vehicle M based on the vehicle time-series data. For example, the reproduction moving image generation unit 130 may dynamically display a motion of the hands and feet of the driver of the own vehicle M in the reproduction moving image based on steering wheel operation information, accelerator operation information, brake operation information, light operation information, turn signal operation information, or the like included in the vehicle time-series data. In this case, the driver can easily review his or her driving operation.

In another modification of the first embodiment, the reproduction moving image generation unit 130 may display a movement history of another traffic participant (for example, an oncoming vehicle X) by lighting it in red or the like in the reproduction moving image. In this case, changes in the situation of the other traffic participant such as deceleration of the oncoming vehicle X due to a brake operation can be easily recognized from the front or lateral side of the own vehicle M.

Second Embodiment

Figure 8:
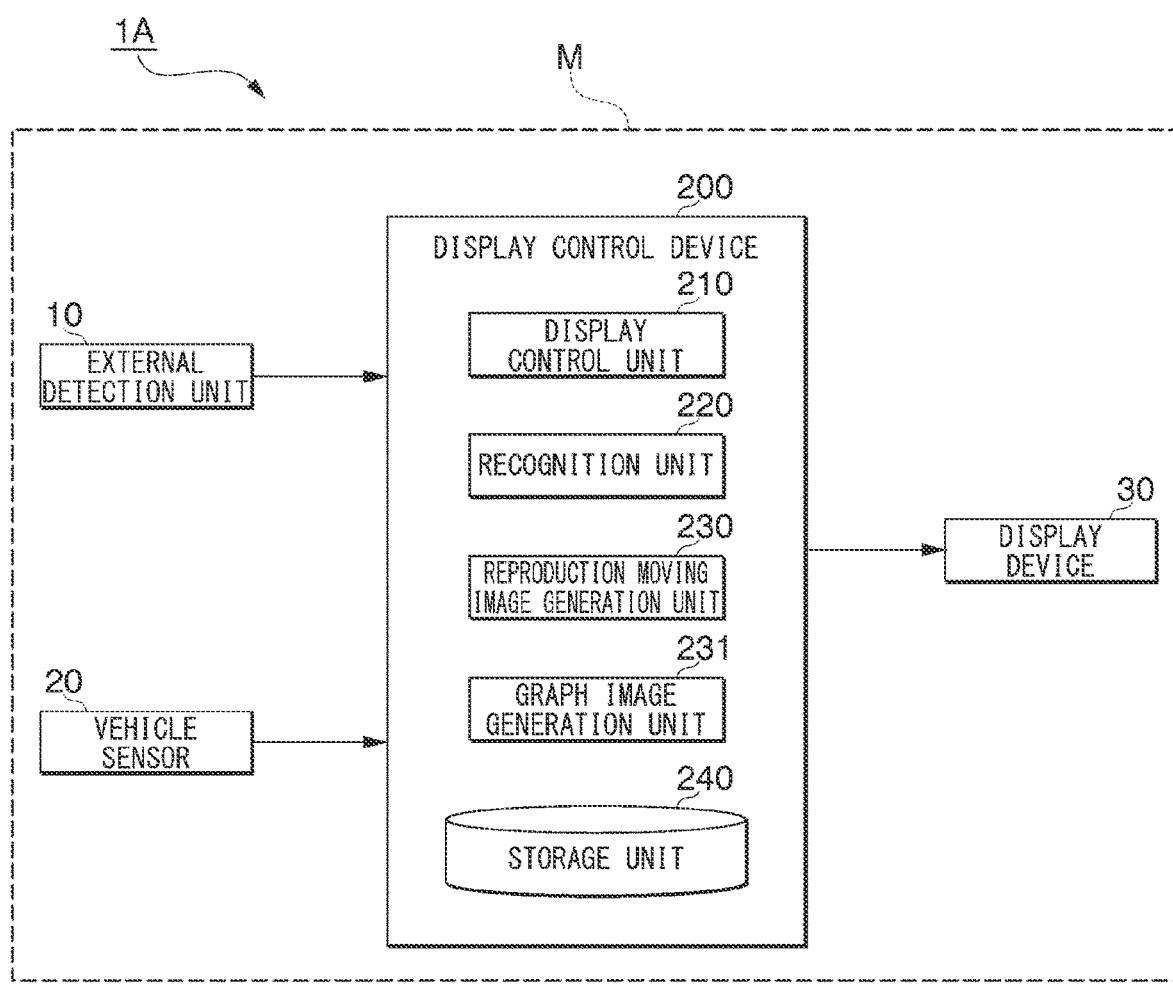
FIG. 8 is a block diagram showing an exemplary configuration of a reproduction system according to a second embodiment.

A reproduction system, a reproduction method, and a storage medium storing a reproduction program according to a second embodiment will be described below with reference to the drawings. FIG. 8 is a block diagram showing an exemplary configuration of a reproduction system 1A according to the present embodiment. The reproduction system 1A is configured to generate, by computer graphics, a moving image (hereinafter also referred to as a reproduction moving image) that reproduces the driving history of an own vehicle M at a location near a stop position of the own vehicle M (hereinafter referred to as a specific traffic location) when the own vehicle M has stopped due to an indicator (hereinafter referred to as a stop indicator), such as a traffic signal or a temporary stop sign, instructing the own vehicle M to stop. The reproduction system 1A is also configured to display the generated reproduction moving image.

The reproduction system 1A includes, for example, the external detection unit 10, the vehicle sensors 20, the display device 30, and a display control device 200. The external detection unit 10, the vehicle sensors 20, the display device 30, and the display control device 200 may be mounted to the own vehicle M. These devices or apparatuses may be connected to each other by a multiplex communication line or a serial communication line such as a controller area network (CAN) communication line, a wireless communication network, or the like. The components shown in FIG. 8 are merely an example and some of the components may be omitted or other components may be added. The basic configurations of the external detection unit 10, the vehicle sensors 20, and the display device 30 of the present embodiment are similar to those of the first embodiment and thus description thereof will be omitted here.

The external detection unit 10 includes various devices for acquiring external information of the own vehicle M. The "external information" includes information regarding, for example, the shapes and positions (relative positions with respect to the own vehicle M) of lane lines or pedestrian crossings drawn on or attached to the road surface, bicycle crossings, road surface markings such as stop lines, traffic signals, road signs such as temporary stop signs, railroad crossings, curbs, median strips, guardrails, or fences. The external detection unit 10 includes, for example, a camera, a light detection and ranging (LIDAR) device, a radar device, or a sensor fusion device.

The display control device 200 includes, for example, a display control unit 210, a recognition unit 220, a reproduction moving image generation unit 230, a graph image generation unit 231, and a storage unit 240. The functions of the display control unit 210, the recognition unit 220, the reproduction moving image generation unit 230, and the graph image generation unit 231 are implemented, for example, by a hardware processor such as a central processing unit (CPU) executing a program (software). Some or all of these components may be implemented by hardware (including circuitry) such as a large-scale integration (LSI), an application specific integrated circuit (ASIC), a field-programmable gate array (FPGA), or a graphics processing unit (GPU) or may be implemented by software and hardware in cooperation. The program may be stored in a storage device (not shown) in advance or may be stored in a detachable storage medium (a non-transitory storage medium) such as a DVD or a CD-ROM and then installed by mounting the storage medium in a drive device. Some or all of the functions of the display control unit 210, the recognition unit 220, the reproduction moving image generation unit 230, and the graph image generation unit 231 may be implemented by the same hardware.

The recognition unit 220 recognizes situations such as the types and positions of objects present near the own vehicle M based on the external information output by the external detection unit 10. The "objects" include, for example, some or all of lane lines, pedestrian crossings, bicycle crossings, road surface markings such as stop lines, traffic signals, road signs such as temporary stop signs, railroad crossings, curbs, median strips, guardrails, or fences. The types of objects include the colors of lane lines, the shapes of lane lines (a solid line or a dashed line), and the colors (including arrow signals) of traffic signals.

For example, when image data captured by the camera of the external detection unit 10 has been input to the recognition unit 220, the recognition unit 220 may input the image data to a trained model, which has been trained to output an image recognition result, to acquire an external situation. The type of an object can also be estimated based on the size of the object in the image data, the intensity of a reflected wave received by the radar device of the external detection unit 10, or the like.

The positions of objects are recognized, for example, as positions in relative coordinates (that is, positions relative to the own vehicle M) with a representative point (such as the center of gravity or the center of a drive shaft of the own vehicle M) as the origin. The positions of objects include, for example, relative positions of left lane lines, right lane lines, left curbs, right curbs, stop lines, traffic signals, or temporary stop signs with respect to the own vehicle M.

The display control unit 210 generates external time-series data indicating an external situation of the own vehicle M in time series based on the recognition result output by the recognition unit 220. The display control unit 210 also generates vehicle time-series data indicating a driving situation of the own vehicle M in time series based on the vehicle information output by the vehicle sensors 20.

The external time-series data includes, for example, a distance from the own vehicle M to a left lane line, a distance from the own vehicle M to a right lane line, a distance from the own vehicle M to a left curb, a distance from the own vehicle M to a right curb, a distance from the own vehicle M to a stop line, a distance from the own vehicle M to a traffic signal, a distance from the own vehicle M to a temporary stop sign, the color of a lane line, the shape of a lane line, and the color (including an arrow signal) of a traffic signal in time series.

The vehicle time-series data includes, for example, a vehicle speed, steering wheel operation information, accelerator operation information, brake operation information, light operation information, turn signal operation information, wiper operation information, and hazard light operation information in time series.

The display control unit 210 inputs the external time-series data and the vehicle time-series data to the reproduction moving image generation unit 230. The display control unit 210 causes the reproduction moving image generation unit 230 to generate a reproduction moving image based on the external time-series data and the vehicle time-series data. The display control unit 210 causes the display device 30 to display the reproduction moving image. The display control unit 210 determines whether to cause the reproduction moving image generation unit 230 to generate a reproduction moving image, whether to cause the display device 30 to display the reproduction moving image, and the like. The display control unit 210 performs control based on the determination result.

The display control unit 210 inputs the vehicle time-series data to the graph image generation unit 231. The display control unit 210 causes the graph image generation unit 231 to generate a graph image based on the vehicle time-series data. The display control unit 210 causes the display device 30 to display the graph image. The display control unit 210 also determines whether to cause the graph image generation unit 231 to generate a graph image, whether to cause the display device 30 to display the graph image, and the like. The display control unit 210 also performs control based on the determination result.

The display device 30 displays the reproduction moving image generated by the reproduction moving image generation unit 230 and the graph image generated by the graph image generation unit 231. When the display device 30 is mounted to the own vehicle M, the display device 30 may display an information image representing various information to be presented to the driver of the own vehicle M in addition to the reproduction moving image and the graph image.

The storage unit 240 stores abstracted image data corresponding to the types of objects (hereinafter referred to as abstract data). The storage unit 240 stores, for example, abstract data corresponding to traffic signals, road signs such as temporary stop signs, and the like. For example, when the types of objects are traffic signals, abstract data may be prepared for each of the types (such as a shape and color) of traffic signals.

The reproduction moving image generation unit 230 may use the sizes of objects recognized by the recognition unit 220 as parameters to adjust the shapes of corresponding abstract data and then use the abstract data with the adjusted shapes to generate a reproduction moving image. The reproduction moving image generation unit 230 may correct the shapes of objects displayed in the reproduction moving image based on the shape of a straight reference line (such as, for example, a stop line) on the road. Because the reference line is a straight line, a more realistic reproduction moving image can be generated, for example, by correcting the shape of each object such that the reference line becomes a straight line in a reproduction moving image from a lateral direction.

The reproduction moving image generation unit 230 generates a reproduction moving image at a specific traffic location based on the external time-series data and the vehicle time-series data. The reproduction moving image generated by the reproduction moving image generation unit 230 will be described below.

The specific traffic location includes a stop indicator, such as a red traffic signal or a temporary stop sign, instructing the own vehicle M to stop. The specific traffic location includes a location near a stop position of the own vehicle M when the own vehicle M has stopped due to a stop indicator. The location near the stop position of the own vehicle M includes a range from a position which is a predetermined distance (for example, several meters) before a target stop position of the own vehicle M to the target stop position. The location near the stop position of the own vehicle M includes, for example, a range from a position where the driver of the own vehicle M can possibly recognize a stop indicator (hereinafter also referred to as a target recognition position) to the target stop position of the own vehicle M. The target stop position is, for example, the position of a stop line on a road on which the own vehicle M travels.

The reproduction moving image generation unit 230 generates a background image at a specific traffic location where the own vehicle M has traveled based on the external time-series data. The background image may include, for example, lane lines, pedestrian crossings, bicycle crossings, road surface markings such as stop lines, traffic signals, road signs such as temporary stop signs, railroad crossings, curbs, median strips, guardrails, or fences. Lines marked on roads such as lane lines may be rendered (drawn) in the moving image based on geometric data recognized by the recognition unit 220, rather than based on the abstract data stored in the storage unit 240.

The reproduction moving image generation unit 230 reads abstract data corresponding to the type of an object recognized by recognition unit 220 from the storage unit 240. For example, when the recognition unit 220 has recognized a traffic signal, the reproduction moving image generation unit 230 reads abstract data corresponding to the type (such as the shape or color) of the traffic signal. The reproduction moving image generation unit 230 adjusts the shape of the abstract data displayed in the reproduction moving image based on the size of the object recognized by the recognition unit 220. For example, when the recognition unit 220 has recognized a vertical dimension of the traffic signal, the reproduction moving image generation unit 230 adjusts the vertical width of abstract data indicating the traffic signal using the recognized vertical dimension.

The reproduction moving image generation unit 230 dynamically displays a movement history of the own vehicle M at the specific traffic location in the reproduction moving image based on information such as the vehicle speed included in the vehicle time-series data.

Figure 9:
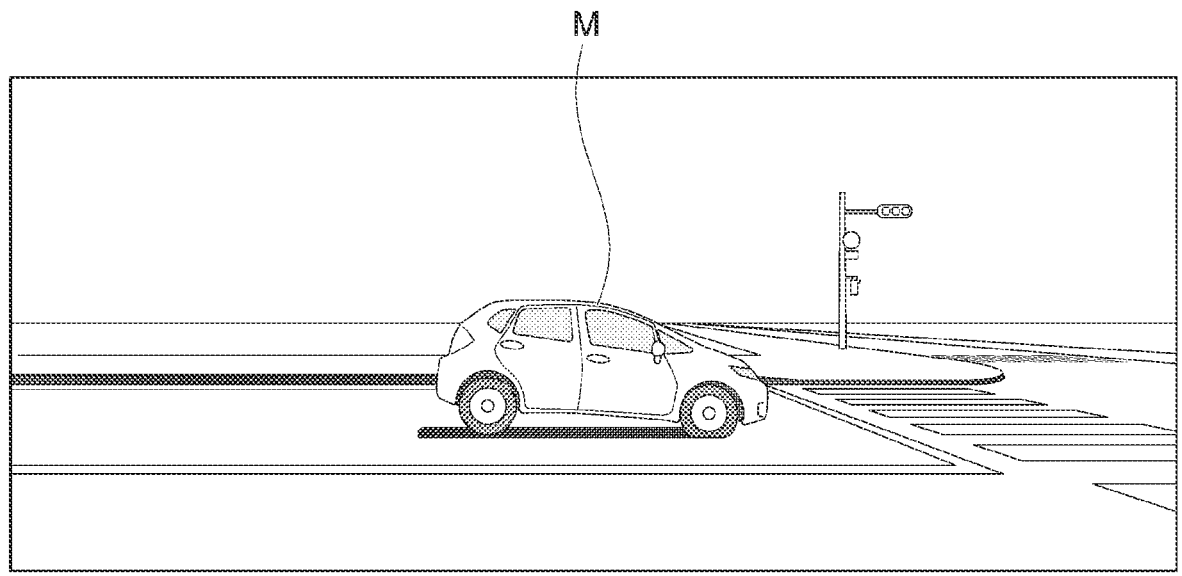
FIG. 9 is a diagram illustrating a scene of a reproduction moving image from a lateral direction generated by the reproduction system of the second embodiment.
Figure 10:
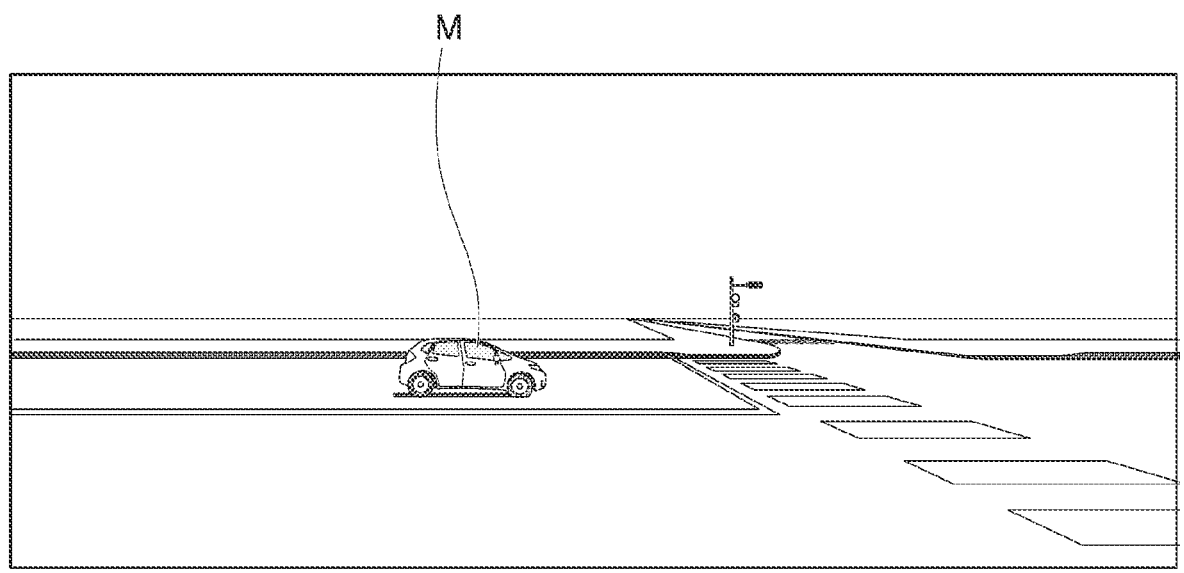
FIG. 10 is a diagram illustrating a scene of a reproduction moving image from a lateral direction generated by the reproduction system of the second embodiment.
Figure 11:
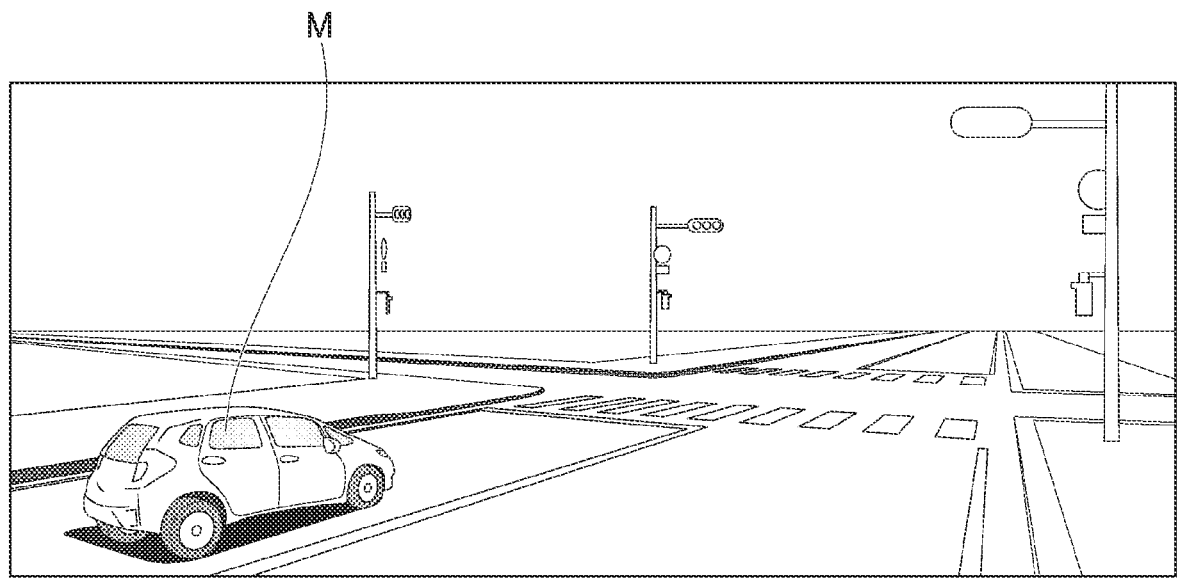
FIG. 11 is a diagram illustrating a scene of a reproduction moving image from an oblique rear direction generated by the reproduction system of the second embodiment.

FIGS. 9 to 11 show examples of reproduction moving images generated by the reproduction moving image generation unit 230 and displayed on the display device 30. The reproduction moving images are moving images reproducing the movement history of the own vehicle M from perspectives outside the own vehicle M. For example, a reproduction moving image is a moving image of the own vehicle M as seen from a direction intersecting the traveling direction of the own vehicle M. FIG. 9 shows a close-up moving image of the own vehicle M from a lateral direction, FIG. 10 shows a remote moving image of the own vehicle M from a lateral direction, and FIG. 11 shows a moving image of the own vehicle M from an oblique rear direction. An image displayed on the display device 30 may include icons for switching moving images. The image displayed on the display device 30 may also include an icon for replaying the moving image. When the user operates the icons, the display control unit 210 performs control corresponding to the operated icon.

As shown in FIGS. 9 to 11, the reproduction moving image includes a background image showing a specific traffic location and a movement history of the own vehicle M. The background image may be displayed statically or dynamically. For example, in the close-up moving image from the lateral direction shown in FIG. 9, the background image is dynamically displayed according to the movement of the own vehicle M. In the remote moving image from the lateral direction shown in FIG. 10 and the moving image from the oblique rear direction shown in FIG. 11, the background image is statically displayed.

The graph image generation unit 231 generates a graph image representing changes in the vehicle speed of the own vehicle M at the specific traffic location based on the speed of the own vehicle M, accelerator pedal operation information, brake pedal operation information, or the like detected by the vehicle sensors 20. The graph image generation unit 231 also generates a graph image representing a target vehicle speed of the own vehicle M. The target vehicle speed is, for example, the speed of the own vehicle M when the driver starts operating the brake pedal at the target recognition position, decelerates the own vehicle M at a constant rate, and stops the own vehicle M at the target stop position.

Figure 12:
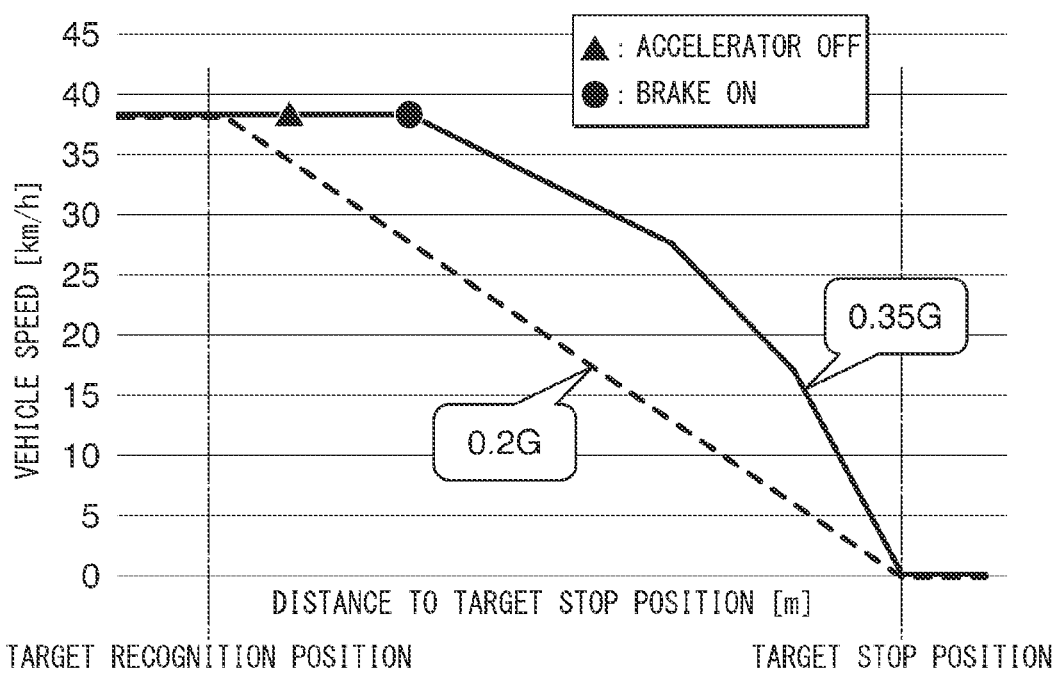
FIG. 12 is a diagram illustrating a graph image showing changes in vehicle speed of the own vehicle, generated by the reproduction system of the second embodiment.

FIG. 12 shows an example of a graph image generated by the graph image generation unit 231 and displayed on the display device 30. As shown in FIG. 12, the graph image shows the vehicle speed of the own vehicle M (solid line) and the target vehicle speed (dashed line). As shown in FIG. 12, the graph image may show a point in time when the driver finishes operating the accelerator pedal and a point in time when the driver starts operating the brake pedal. The graph image may also show the deceleration of the own vehicle M and the deceleration of the target vehicle speed.

The reproduction moving image generation unit 230 and the graph image generation unit 231 may generate a reproduction moving image and a graph image and cause the display device 30 to display the generated reproduction moving image and graph image each time a moving image output command is received. Alternatively, the reproduction moving image generation unit 230 and the graph image generation unit 231 may have a storage area for storing generated reproduction moving images and graph images, and upon receiving a moving image output command, retrieve a reproduction moving image and a graph image stored in the storage area and output them to the display device 30.

The display control unit 210 may determine whether to cause the display device to display a reproduction moving image and a graph image each time the own vehicle M stops. In this case, the display control unit 210 may cause the display device 30 to display a reproduction moving image and a graph image only when a predetermined condition is satisfied. The "predetermined condition" may be a specifically defined condition which is considered to have room for improvement in terms of safety based on a driving situation of the own vehicle M. The predetermined condition is, for example, when the deceleration of the own vehicle M exceeds a threshold.

Figure 13:
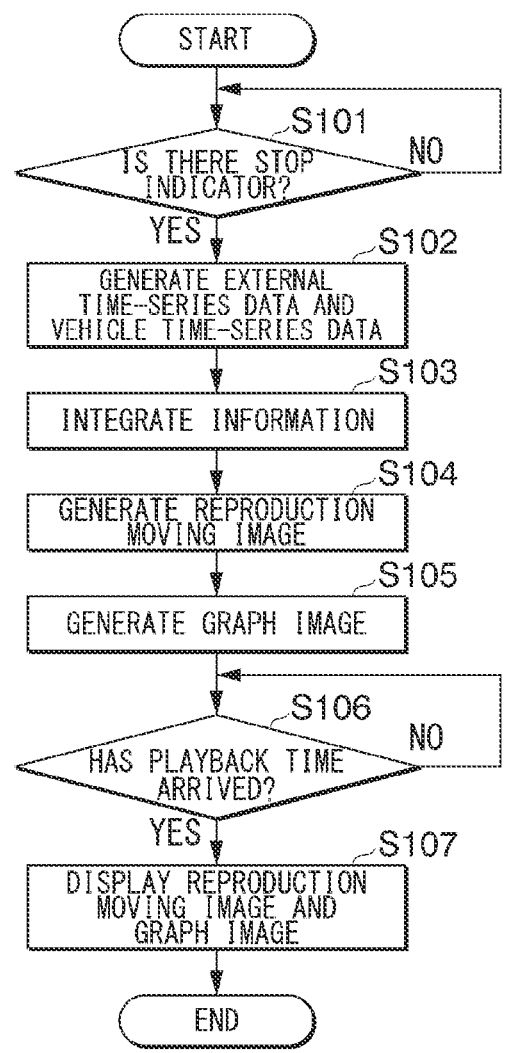
FIG. 13 is a flowchart showing an example of a process performed by the reproduction system of the second embodiment.

FIG. 13 is a flowchart showing an example of a process performed by the reproduction system 1A. This flowchart is an example and a process may also be performed according to another flowchart.

In the example of FIG. 13, first, the display control unit 210 determines whether there is a stop indicator ahead of the own vehicle M (step S101). Upon determining that there is a stop indicator ahead of the own vehicle M (YES in step S101), the process proceeds to step S102. If it is not determined that there is a stop indicator ahead of the own vehicle M (NO in step S101), the display control unit 210 performs the process of step S101 again.

In step S102, the display control unit 210 generates external time-series data and vehicle time-series data in an interval from the target recognition position to the target stop position. The vehicle time-series data and the external time-series data may be constantly generated while the own vehicle M is traveling.

In step S103, the display control device 200 (for example, the display control unit 210 or the reproduction moving image generation unit 230) integrates information necessary to generate a moving image. In step S104, the reproduction moving image generation unit 230 generates a reproduction moving image. In step S105, the graph image generation unit 231 generates a graph image. In step S106, the display control unit 210 determines whether a playback time has arrived. Upon determining that the playback time has arrived (YES in step S106), the process proceeds to step S107 and the display control unit 210 causes the display device 30 to display the reproduction moving image and the graph image. Then, the process of this flowchart ends.

As described above, the reproduction system 1A of the present embodiment includes the external detection unit 10 that acquires external information, the vehicle sensor 20 that acquires vehicle information of the own vehicle M, the reproduction moving image generation unit 230 that generates a moving image that reproduces a movement history of the own vehicle M at a specific traffic location, and the display control unit 210 that causes the display device 30 to display the moving image. The reproduction moving image generation unit 230 generates a moving image based on external time-series data generated based on the external information, the external time-series data indicating an external situation of the own vehicle M in time series, and vehicle time-series data generated based on the vehicle information, the vehicle time-series data indicating a driving situation of the own vehicle M in time series.

According to this reproduction system 1A, the movement history of the own vehicle M at a specific traffic location can be reproduced through a moving image generated by computer graphics. Thus, the situation at the specific traffic location can be reproduced in an easy-to-understand manner.

The reproduction moving image generation unit 230 generates a moving image that reproduces the movement history of the own vehicle M from a position before a target stop position of the own vehicle M to the target stop position at the specific traffic location including a stop indicator.

According to this reproduction system 1A, the movement history of the own vehicle M at a specific traffic location including a stop indicator such as a traffic signal or a temporary stop sign can be reproduced through a moving image generated by computer graphics. Therefore, the driver can objectively review the driving history of the own vehicle M when the own vehicle M has stopped due to a stop indicator, such as a traffic signal or a temporary stop sign, instructing the own vehicle M to stop.

The target stop position may be the position of a stop line on a road on which the own vehicle M travels, the external detection unit 10 may include an image sensor that captures an image in front of the own vehicle M, the external time-series data may include time-series positions of a stop line and a lane line, the vehicle time-series data may be input to the reproduction moving image generation unit 230 through an in-vehicle communication network (a CAN) of the own vehicle M, and the reproduction moving image generation unit 230 may cause the stop line and the lane line to be displayed in the moving image using information regarding the stop line and the lane line included in the external time-series data. According to this configuration, a moving image can be generated using existing hardware resources installed in the vehicle. In addition, the stop line and the lane line can be displayed in the moving image without using GPS, map information, or the like and the processing load when generating the moving image can be reduced. By reducing the processing load, a moving image can be generated in a short time, and a moving image can be displayed on the display device 30 in a timely manner, for example, when the own vehicle M stops.

The stop indicator may include a traffic signal and the reproduction moving image generation unit 230 may generate a moving image that reproduces the movement history of the own vehicle M when the traffic signal is red. According to this configuration, the driver can objectively review the driving history of the own vehicle M when the own vehicle M has stopped due to a red light.

The reproduction system 1A may further include the graph image generation unit 231 that generates a graph image showing changes in the vehicle speed of the own vehicle M at the specific traffic location based on the vehicle time-series data and the display control unit 210 may cause the display device 30 to display the graph image. This configuration allows the driver to recognize changes in the vehicle speed of the own vehicle M, whereby the driver can more objectively review the driving history of the own vehicle M when the own vehicle M has stopped due to a stop indicator.

The moving image may be a moving image of the own vehicle M as seen from a direction intersecting the traveling direction of the own vehicle M. This allows the driver to more objectively review the driving history of the own vehicle M.

In the present embodiment as well, the reproduction system 1A may further include an internal detection unit 40 that acquires internal information of the own vehicle M, similar to the first embodiment. In this case, the recognition unit 220 recognizes the situation of the driver of the own vehicle M based on the internal information output by the internal detection unit 40. The display control unit 210 generates driver time-series data indicating the situation of the driver of the own vehicle M in time series based on the recognition result output by the recognition unit 220. The reproduction moving image generation unit 230 generates a reproduction moving image at the specific traffic location based on the external time-series data, the vehicle time-series data, and the driver time-series data. Specifically, in addition to a background image at the specific traffic location and a moving image showing the movement history of the own vehicle M, the reproduction moving image generation unit 230 generates a moving image showing the motion of the driver of the own vehicle M based on the driver time-series data. For example, the reproduction moving image generation unit 230 generates a moving image showing the orientation of the head of the driver of the own vehicle M based on the orientation of the face of the driver of the own vehicle M recognized by the recognition unit 220. The reproduction moving image generation unit 230 may dynamically display the range of the driver's visual field in the reproduction moving image based on the direction of the line of sight of the driver recognized by the recognition unit 220.

The reproduction moving image generation unit 230 may also generate a moving image showing the motion of the driver of the own vehicle M based on the vehicle time-series data. For example, the reproduction moving image generation unit 230 may dynamically display a motion of the hands and feet of the driver of the own vehicle M in the reproduction moving image based on steering wheel operation information, accelerator operation information, brake operation information, light operation information, turn signal operation information, or the like included in the vehicle time-series data.

The embodiments described above can be expressed as follows.

A reproduction system including:
an external detection unit configured to acquire external information of an own vehicle;
a vehicle sensor configured to acquire vehicle information of the own vehicle;
a storage medium configured to store computer-readable instructions; and
a processor connected to the storage medium,
wherein the processor executes the computer-readable instructions to:
generate external time-series data indicating an external situation of the own vehicle in time series based on the external information;
generate vehicle time series data indicating a driving situation of the own vehicle in time series based on the vehicle information;
generate a moving image that reproduces a movement history of the own vehicle at a specific traffic location and a movement history of another traffic participant whose course intersects that of the own vehicle at the specific traffic location together based on the external time-series data and the vehicle time-series data; and
cause a display device to display the moving image.

The embodiments described above can be expressed as follows.

A reproduction system including:
an external detection unit configured to acquire external information of an own vehicle;
a vehicle sensor configured to acquire vehicle information of the own vehicle;
a storage medium configured to store computer-readable instructions; and
a processor connected to the storage medium,
wherein the processor executes the computer-readable instructions to:
generate external time-series data indicating an external situation of the own vehicle in time series based on the external information;
generate vehicle time series data indicating a driving situation of the own vehicle in time series based on the vehicle information;
generate, based on the external time-series data and the vehicle time-series data, a moving image that reproduces a movement history of the own vehicle at a specific traffic location from a perspective of another traffic participant whose course intersects that of the own vehicle at the specific traffic location; and
cause a display device to display the moving image.

The embodiments described above can be expressed as follows.

A reproduction system including:
an external detection unit configured to acquire external information of an own vehicle;
a vehicle sensor configured to acquire vehicle information of the own vehicle;
a storage medium configured to store computer-readable instructions; and
a processor connected to the storage medium,
wherein the processor executes the computer-readable instructions to:
generate external time-series data indicating an external situation of the own vehicle in time series based on the external information;
generate vehicle time series data indicating a driving situation of the own vehicle in time series based on the vehicle information;
generate, based on the external time-series data and the vehicle time-series data, a moving image that reproduces a movement history of the own vehicle from a position before a target stop position of the own vehicle to the target stop position at a specific traffic location including a stop indicator installed on a road on which the own vehicle travels, the stop indicator instructing the own vehicle to stop; and
cause a display device to display the moving image.

The technical scope of the present invention is not limited to the above embodiments and various changes can be made without departing from the spirit of the present invention.

For example, a part of the reproduction system 1 or 1A (such as, for example, the display device 30 or the display control device 100 or 200) may be mounted in an apparatus (such as a server, a personal computer, a smartphone, or a tablet) that performs wireless communication with the own vehicle M rather than being mounted to the own vehicle M. That is, the moving image may be generated and played by an apparatus remote from the own vehicle M.

In a specific example, moving images generated by the reproduction moving image generation unit 130 or 230 may be stored in a storage unit provided in a server or the like. Then, based on an operation performed on an apparatus connected to the server, the reproduction moving images may be displayed on a display device of the apparatus. In this case, the driver can watch the moving images at home or the like and review his or her own driving operation. Alternatively, it is also possible to provide training using the reproduction moving images at a driving school or the like.

In the first embodiment, an intersection is described as an example of the specific traffic location. However, the specific traffic location need not be an intersection and may be, for example, a point in a parking lot. Alternatively, the specific traffic location may be a connection point between a parking lot or the like and a road. In these cases as well, it is possible to promote safer driving by objectively showing the movement history of the own vehicle M to the driver.

The components in the above embodiments can be appropriately replaced with well-known components without departing from the spirit of the present invention and the above embodiments and modifications may be combined as appropriate.

What is claimed is:
1. A reproduction system comprising:
an external detection unit configured to acquire external information of an own vehicle;
a vehicle sensor configured to acquire vehicle information of the own vehicle;
a non-transitory storage medium storing computer-readable instructions; and
at least one processor connected to the non-transitory storage medium, wherein the at least one processor executes the computer-readable instructions to:
generate external time-series data indicating an external situation of the own vehicle in time series based on the external information;
generate vehicle time series data indicating a driving situation of the own vehicle in time series based on the vehicle information;

generate, based on the external time-series data and the vehicle time-series data, a moving image that reproduces a movement history of the own vehicle at a specific traffic location on driving of the own vehicle by a driver; and cause a display device to display the moving image.

2. The reproduction system according to claim 1, wherein the at least one processor executes the computer-readable instructions to generate, based on the external time-series data and the vehicle time-series data, a moving image that reproduces a movement history of another traffic participant whose course intersects that of the own vehicle at the specific traffic location together with the movement history of the own vehicle at the specific traffic location.

3. The reproduction system according to claim 1, wherein the at least one processor executes the computer-readable instructions to generate, based on the external time-series data and the vehicle time-series data, a moving image that reproduces the movement history of the own vehicle at the specific traffic location from a perspective of another traffic participant whose course intersects that of the own vehicle at the specific traffic location.

4. The reproduction system according to claim 2, wherein the external detection unit includes an image sensor configured to capture an image in front of the own vehicle, the external time-series data includes time-series positions of a stop line and a lane line on a road on which the own vehicle has traveled, and the at least one processor executes the computer-readable instructions to transmit the vehicle time-series data through an in-vehicle communication network of the own vehicle.

5. The reproduction system according to claim 2, wherein the specific traffic location is an intersection, and the at least one processor executes the computer-readable instructions to display the intersection in the moving image using information regarding a reference line marked on a road before the own vehicle changes course at the intersection and information regarding a second reference line marked on a road after the own vehicle changes course at the intersection.

6. The reproduction system according to claim 2, wherein the at least one processor executes the computer-readable instructions to generate abstracted image data corresponding to the other traffic participant using information regarding the other traffic participant included in the external time-series data and display the image data in the moving image as the other traffic participant.

7. The reproduction system according to claim 3, wherein the external detection unit includes an image sensor configured to capture an image in front of the own vehicle, the external time-series data includes time-series positions of a stop line and a lane line on a road on which the own vehicle has traveled, and the at least one processor executes the computer-readable instructions to transmit the vehicle time-series data through an in-vehicle communication network of the own vehicle.

8. The reproduction system according to claim 3, wherein the specific traffic location is an intersection, and the at least one processor executes the computer-readable instructions to display the intersection in the moving image using information regarding a reference line marked on a road before the own vehicle changes course at the intersection and information regarding a second reference line marked on a road after the own vehicle changes course at the intersection.

9. The reproduction system according to claim 3, wherein the at least one processor executes the computer-readable instructions to generate abstracted image data corresponding to the other traffic participant using information regarding the other traffic participant included in the external time-series data and display the image data in the moving image as the other traffic participant.

10. The reproduction system according to claim 1, wherein the specific traffic location includes a stop indicator installed on a road on which the own vehicle travels, the stop indicator instructing the own vehicle to stop, and the at least one processor executes the computer-readable instructions to generate, based on the external time-series data and the vehicle time-series data, a moving image that reproduces the movement history of the own vehicle from a position before a target stop position of the own vehicle to the target stop position at the specific traffic location.

11. The reproduction system according to claim 10, wherein the target stop position is a position of a stop line on the road on which the own vehicle travels, the external detection unit includes an image sensor configured to capture an image in front of the own vehicle, the external time-series data includes a time-series position of the stop line and a time-series position of a lane line on the road on which the own vehicle travels, the at least one processor executes the computer-readable instructions to transmit the vehicle time-series data through an in-vehicle communication network of the own vehicle, and the at least one processor executes the computer-readable instructions to display the stop line and the lane line in the moving image using information regarding the stop line and the lane line included in the external time-series data.

12. The reproduction system according to claim 10, wherein the stop indicator includes a traffic signal, and the at least one processor executes the computer-readable instructions to generate a moving image that reproduces the movement history of the own vehicle when the traffic signal is red.

13. The reproduction system according to claim 10, wherein the at least one processor executes the computer-readable instructions to generate a graph image showing a change in vehicle speed of the own vehicle at the specific traffic location based on the vehicle time-series data, and cause the display device to display the graph image.

14. The reproduction system according to claim 10, wherein the moving image is a moving image of the own vehicle as seen from a direction intersecting a traveling direction of the own vehicle.

15. The reproduction system according to claim 1, further comprising an internal detection unit configured to acquire internal information of the own vehicle, wherein the at least one processor executes the computer-readable instructions to generate a moving image that reproduces a movement of the driver of the own vehicle together with the movement history of the own vehicle at the specific traffic location based on driver time-series data generated based on the internal information, the driver time-series data indicating a situation of the driver of the own vehicle in time series.

16. A reproduction method comprising:

by a computer for a reproduction system including an external detection unit configured to acquire external information of an own vehicle and a vehicle sensor configured to acquire vehicle information of the own vehicle, generating a moving image that reproduces a movement history of the own vehicle at a specific traffic location on driving of the own vehicle by a driver, based on external time-series data generated based on the external information, the external time-series data indicating an external situation of the own vehicle in time series, and vehicle time-series data generated based on the vehicle information, the vehicle time-series data indicating a driving situation of the own vehicle in time series; and causing a display device to display the moving image.

17. The reproduction method according to claim 16, wherein a moving image that reproduces a movement history of another traffic participant whose course intersects that of the own vehicle at the specific traffic location together with the movement history of the own vehicle at the specific traffic location is generated based on the external time-series data and the vehicle time-series data.

18. The reproduction method according to claim 16, wherein a moving image that reproduces the movement history of the own vehicle at the specific traffic location from a perspective of another traffic participant whose course intersects that of the own vehicle at the specific traffic location is generated based on the external time-series data and the vehicle time-series data.

19. The reproduction method according to claim 16, wherein the specific traffic location includes a stop indicator installed on a road on which the own vehicle travels, the stop indicator instructing the own vehicle to stop, and a moving image that reproduces the movement history of the own vehicle from a position before a target stop position of the own vehicle to the target stop position at the specific traffic location is generated based on the external time-series data and the vehicle time-series data.

20. A non-transitory computer storage medium storing a reproduction program causing a computer for a reproduction system including an external detection unit configured to acquire external information of an own vehicle and a vehicle sensor configured to acquire vehicle information of the own vehicle to:

generate a moving image that reproduces a movement history of the own vehicle at a specific traffic location on driving of the own vehicle by a driver, based on external time-series data generated based on the external information, the external time-series data indicating an external situation of the own vehicle in time series, and vehicle time-series data generated based on the vehicle information, the vehicle time-series data indicating a driving situation of the own vehicle in time series; and cause a display device to display the moving image.

21. The storage medium according to claim 20, wherein the reproduction program causes the computer for the reproduction system to generate, based on the external time-series data and the vehicle time-series data, a moving image that reproduces a movement history of another traffic participant whose course intersects that of the own vehicle at the specific traffic location together with the movement history of the own vehicle at the specific traffic location.

22. The storage medium according to claim 20, wherein the reproduction program causes the computer for the reproduction system to generate, based on the external time-series data and the vehicle time-series data, a moving image that reproduces the movement history of the own vehicle at the specific traffic location from a perspective of another traffic participant whose course intersects that of the own vehicle at the specific traffic location.

23. The storage medium according to claim 20, wherein the specific traffic location includes a stop indicator installed on a road on which the own vehicle travels, the stop indicator instructing the own vehicle to stop, and the reproduction program causes the computer for the reproduction system to generate, based on the external time-series data and the vehicle time-series data, a moving image that reproduces the movement history of the own vehicle from a position before a target stop position of the own vehicle to the target stop position at the specific traffic location.

* * * * *